United States Patent
Dlugosch et al.

[11] Patent Number: 6,068,191
[45] Date of Patent: May 30, 2000

[54] SMART CARD WITH CARD BODY AND SEMICONDUCTOR CHIP ON A LEADFRAME

[75] Inventors: Dieter Dlugosch, Heilsbronn; Roland Prass, Ottensoos; Josef Kirschbauer, Blaibach; Günter Didschies, Nürnberg, all of Germany

[73] Assignee: Siemens Aktiengesellschaft, Munich, Germany

[21] Appl. No.: 09/243,832

[22] Filed: Feb. 1, 1999

Related U.S. Application Data

[63] Continuation of application No. PCT/DE97/01626, Jul. 31, 1997.

[30] Foreign Application Priority Data

Aug. 1, 1996 [DE] Germany .......................... 196 31 166

[51] Int. Cl.⁷ .................................................. G06K 19/00
[52] U.S. Cl. .......................................... 235/487; 235/492
[58] Field of Search .................................. 235/487, 492, 235/488

[56] References Cited

U.S. PATENT DOCUMENTS 5,834,755  11/1998  Haghiri-Tehrani et al. ............ 235/492

FOREIGN PATENT DOCUMENTS

| 0 343 030 A1 | 11/1989 | European Pat. Off. . |
| 0 688 051 A1 | 12/1995 | European Pat. Off. . |
| 33 38 597 A1 | 5/1985 | Germany . |
| 44 41 931 C1 | 7/1995 | Germany . |
| 295 21 317 U 1 | 4/1997 | Germany . |

OTHER PUBLICATIONS

Patent Abstracts of Japan No. 03–187792 (Koichiro), dated Aug. 15, 1991.

Patent Abstracts of Japan No. 02–261696 (Tetsushisa), dated Oct. 24, 1990.

*Primary Examiner*—Karl D. Frech
*Attorney, Agent, or Firm*—Herbert L. Lerner; Laurence A. Greenberg; Werner H. Stemer

[57] ABSTRACT

The smart card has a semiconductor chip combined with a leadframe. The smart card is rendered operationally and functionally reliable with regard to bending and tensile stresses, in that the connecting tabs which form the electrical contacts of the leadframe are extended to the outside and embedded in the plastic card body. Beads are incorporated for the additional relief of mechanical stresses.

6 Claims, 1 Drawing Sheet

SMART CARD WITH CARD BODY AND SEMICONDUCTOR CHIP ON A LEADFRAME

CROSS-REFERENCE TO RELATED APPLICATION

This application is a continuation of copending International application No. PCT/DE97/01626, filed Jul. 31, 1997, which designated the United States.

BACKGROUND OF THE INVENTION

Field of the Invention

The invention relates to a smart card comprising a plastic card body with a semiconductor chip that is mechanically fastened and that is contacted by means of a leadframe. The leadframe constitutes electrical contacts for contacting from the outside, ensures the electrical contact with the chip, and it is formed, in the region of the electrical contacts, in the form of contact tabs.

A general problem in the production of smart cards with a leadframe is the permanent and operationally reliable connection between the chip, the chip module containing the leadframe or the leadframe and the plastic card body on the other side. The chip itself is generally bonded into a recess within the plastic card body. Reinforcing elements are incorporated in the plastic card body, which is, for example, bent in operation. The placing of the electrical contacts in relation to the chip may be different. In is thereby possible, for example, for a so-called chip module to have a stiffness which prevents damage to the chip and to the contacts which are present on the chip module. If, however, the electrical contacts are arranged relatively far away to the outside from the chip, problems result because of a lack of bending strength or tensile strength of contact tabs at the connecting points in the region of the electrical contacts. Furthermore, faults can occur in adhesive connections as a result of the critical reaction mechanism of adhesives which harden at different speeds. Furthermore, the adhesive connections can age or embrittle. Bending up and sticking up of the edges of a leadfeame in the outer region could thus occur.

Prior art smart cards are constructed, for example, by means of bonding a basic element over the complete area using rapidly reacting adhesives or by corresponding stamping.

German Patent application No. P 195 27 331.1, for example, describes a smart card with a plastic card body in which a semiconductor chip is placed. The semiconductor chip is electrically connected to a leadframe which forms contact tabs that are at least in partial contact with a plastic body surrounding the semiconductor chip. In the vicinity of the plastic body, the contact tabs have a flexible region. This form of the arrangement of semiconductor chip and electrical contacts in the basic card body does not ensure that bending of the smart card does not lead to permanent deformations at the contacts (lead-frame), with the result that the ends of the contact tabs could stick up.

German patent DE 44 41 931 C1 describes a smart card with a semiconductor chip and a plastic card body housing the chip. The chip is mechanically fastened in the plastic card body and can be contacted electrically from the outside via electrical contacts. The electrical contacts are part of a lead frame which are contacted with the semiconductor chip. The leadframe has contact tabs towards the outside. The contact tabs run parallel at the surface of the large-area side of the smart card. The contact tabs end at the area provided for contacting.

SUMMARY OF THE INVENTION

It is accordingly an object of the invention to provide a smart card with a semiconductor chip and a leadframe, which overcomes the above-mentioned disadvantages of the heretofore-known devices and methods of this general type and which cannot easily be damaged, even in the event of the introducing of mechanical stresses and shearing when the plastic card is bent, and which assures proper and reliable operational functionality.

With the foregoing and other objects in view there is provided, in accordance with the invention, a smart card, comprising:

a plastic card body defining a card body interior and having a large-area surface;

a semiconductor chip housed in and mechanically fastened to the plastic card body;

a leadframe formed with contact tabs electrically connected to the semiconductor chip, the contact tabs having outer ends disposed in the card body interior distally from the semiconductor chip and running substantially parallel to the large-area surface of the plastic card body, and the contact tabs having contact regions between the outer ends and the semiconductor chip defining electrical contacts for electrically contacting the semiconductor chip from outside the plastic card body, and wherein the contact regions of the contact tabs extending along the large-area surface of the plastic card are not firmly connected with the plastic card body.

The invention is based on the knowledge that a leadframe for a smart card, starting from the electrical contacting of the chip, has the electrical contacts running on the surface, and is furthermore lengthened towards the outside in such a way that the outer ends of the leadframe can be embedded in the interior of the plastic card body. The embedding is carried out in such a way that the outer ends run approximately parallel to the large-area sides of the smart card. The edges located in the region of the electrical contacts are thus connected to the plastic card body and cannot be bent up.

In accordance with an added feature of the invention, each of the contact tabs is formed with a bead or kink between the contact region and the outer end for compensating for mechanical stresses. This approximately V-shaped configuration in the laedframe constitutes a means of compensating for mechanical stresses. If, for example, the connecting tabs are simultaneously bent by bending the basic card body, this V-shaped or U-shaped construction of the leadframe can absorb or dissipate stresses applied in this way, so that the tensile or bending strength is not exceeded at any point of the inner region. For the satisfactory functioning of the relief bead, the latter can advantageously be arranged in a non-encapsulated state within a recess in the plastic card body.

In accordance with an additional feature of the invention, an injection molded frame is integrated into the plastic card body, and the outer ends of the contact tabs are mounted in the injection-molded frame.

In accordance with another feature of the invention, the plastic card body is formed with a lower card part and an upper card part, and the outer ends of the contact tabs are disposed between the lower card part and the upper card part.

In accordance with a further feature of the invention, the outer ends of the contact tabs are rigidly fixed in the plastic card body.

In accordance with a concomitant feature of the invention, the outer ends of the contact tabs, which ends run in the interior of the plastic card body, are mounted such that they can move parallel to the large-area sides of the plastic card body.

The provision of the injection-molded frame is a particularly advantageous feature with regard to the simplified handling during the production of a smart card. The outer ends of the tabs can be easily embedded in the injection-molded frame. This injection molded frame is either bonded into the plastic card body, in an appropriate recess, or welded to the plastic card body. When considering a two-part smart card, which is produced, for example, from a lower card part and an upper card part, it is possible for the outer ends of the leadframe or of the contact tabs to be placed between the lower part and the upper part. For this purpose, an appropriate recess has to be provided in one of the two parts. The outer embedded ends of the contact tabs can be fixed or able to move parallel to the large-area side of the smart card, after the semiconductor chip has been bonded into the plastic card body. After the semiconductor chip has been bonded into the plastic card body, the fixing of semiconductor chip and leadframe is maintained. In order to improve the ability of the smart card to bend without transmitting disturbing mechanical stresses to leadframe and chip, firstly the relief beads are provided. If their operating range is not sufficient, the outer ends of the contact tabs can be mounted in sliding fashion in the plastic card body, instead of being rigidly fixed. This means that they can either slide in the described direction in the injection-molded frame or are able to move in the appropriate direction between the upper card part and the lower card part.

Although the invention is illustrated and described herein as embodied in smart card, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
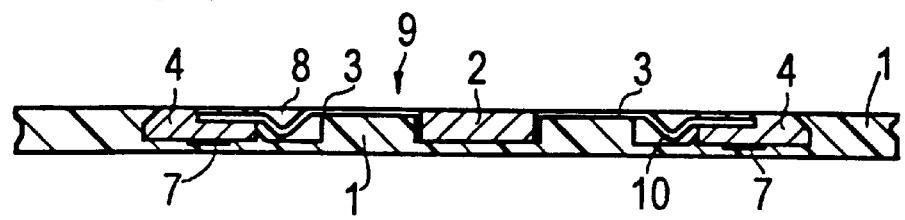
FIG. 1 is a vertical section through a smart card, with an integral injection-molding frame.

Referring now to the figures of the drawing in detail and first, particularly, to FIG. 1 thereof, there is seen a chip module comprising a chip 2 and a leadframe 3, which is provided with an injection-molded frame 4. The ends of the outer connecting tabs of the leadframe 3 that are mounted in the injection-molded frame are connected to the region of the electrical contacts 9 via beads or crimping kinks 10. The ends of the contact tabs that are distal from the chip 2 are embedded in the frame 4 and the contact tabs run largely parallel to the upper large-area surface of the chip card body. The beads 10 are located in recesses 8. The injection-molded frame 4 is glued into the plastic card body 1 by means of an adhesive 7. The semiconductor chip 2, which is for example separately encased in plastic, is thus connected via the leadframe 3 to electrical contacts that are protected against bending in an operationally secure manner in their outer region.

Figure 2:
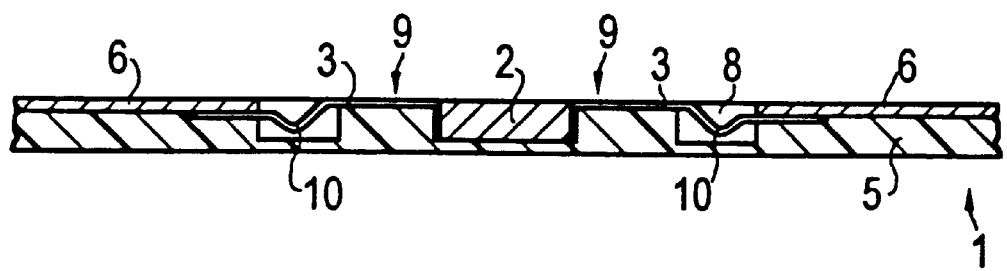
FIG. 2 is a sectional view of a two-part smart card body, with the outer ends of contact tabs mounted between an upper card part and a lower card part.

With reference to FIG. 2, there is shown a two-part smart card formed from a lower card part 5 and an upper card part 6. Analogously to the embodiment of FIG. 1, there is also provided a semiconductor chip 2 connected to a leadframe 3. The electrical contacts 9 are likewise positioned to the outside, adjacent to the semiconductor chip 2, and run on the surface of the plastic card body 1. Also, beads or kinks 10 are disposed in recesses 8, in order to keep bending or tensile stresses away from the leadframe 3 and from the chip 2. The outer ends of the leadframe 3 are embedded in the plastic card body, in a manner analogous to FIG. 1. They are thereby placed between the lower card part 5 and the upper card part 6. For the case in which the embedded contact tabs are laterally movable, the recesses provided for the outer ends of the contact tabs in the lower card part 5 can be designed, parallel to a large-area side of the plastic card body, to be greater than is necessary as a result of the initial design of the combination of semiconductor chip and leadframe 3. In this way, for example, material expansions on the leadframe can be intercepted.

Due to the construction of the smart card according to the invention, the semiconductor chip 2, the inner leadframe region and the plastic card body 1 have no firm connection to one another. As a result, compensating movements are permitted.

In the case of FIG. 1, the injection molding to produce the smart card can take place in one operation with the encapsulation of the chip. For this purpose, for example, an epoxy resin which is able to bond well is used. The advantages by comparison with the prior art are, for example, a compensation of expansion in the event of bending loading as a result of the relief bead and as a result of free space in the joining zone. Furthermore, the encapsulated leadframe, in conjunction with the plastic card body, can be configured in such a way that mechanical fixing takes place during assembly. Hence, slow-reacting or permanently sticky adhesive systems may be used, in which the problems associated with the prior art, such as for instance embrittlement, sensitivity to moisture and so on, are now alleviated. It is no longer possible for the leadframe edges to stick up.

Instead of the adhesive connection, the injection-molded frame 4 may also be welded. Ultrasonic or orbital friction welding methods may be used. This allows further advantages, such as a large-area connection or handling advantages as a result of dispensing with the adhesive, for example, to be achieved.

In the case of the two-part smart card (FIG. 2), the components are likewise welded, bonded or laminated in another way. In that process, the leadframe 3 is laminated in upper card part 6 and lower card part 5. The upper card part 6 can thereby be configured as a simple stamped part. The configuration of FIG. 2 may have economic advantages by comparison with a configuration according to FIG. 1.

We claim:

1. A smart card, comprising:

a plastic card body defining a card body interior and having a large-area surface;

a semiconductor chip housed in and mechanically fastened to said plastic card body;

a leadframe formed with contact tabs electrically connected to said semiconductor chip, said contact tabs having outer ends distally from said semiconductor chip disposed in said card body interior and running substantially parallel to said large-area surface of said plastic card body, and said contact tabs having contact regions extending between said outer ends and said semiconductor chip defining electrical contacts for electrically contacting said semiconductor chip from outside said plastic card body, and wherein said contact regions of said contact tabs extending along said large-area surface of said plastic card are not firmly connected with the plastic card body.

2. The smart card according to claim 1, wherein each of said contact tabs is formed with a bead in between said contact region and said outer end for compensating for mechanical stresses.

3. The smart card according to claim 2, wherein said outer ends of said contact tabs are rigidly fixed in said plastic card body.

4. The smart card according to claim 1, which further comprises an injection molded frame integrated into said plastic card body, said outer ends of said contact tabs being mounted in said injection-molded frame.

5. The smart card according to claim 1, wherein said plastic card body is formed with a lower card part and an upper card part, and said outer ends of said contact tabs are disposed between said lower card part and said upper card part.

6. The smart card acording to claim 1, wherein said outer ends of said contact tabs are mount ed so as to be movable parallel to said large-area surface of said plastic card body.

* * * * *